US010415693B2

(12) United States Patent
Altamura

(10) Patent No.: US 10,415,693 B2
(45) Date of Patent: Sep. 17, 2019

(54) OIL TRANSFER ASSEMBLY FOR SUPPLYING OIL INTO A ROTATING AND TRANSLATING TUBE

(71) Applicant: GE Avio S.r.l., Rivalta di Torino (IT)

(72) Inventor: Paolo Altamura, Brindisi (IT)

(73) Assignee: General Electric Company, Schenectady, NY (US)

(*) Notice: Subject to any disclaimer, the term of this patent is extended or adjusted under 35 U.S.C. 154(b) by 326 days.

(21) Appl. No.: 15/384,179

(22) Filed: Dec. 19, 2016

(65) Prior Publication Data

US 2017/0175877 A1    Jun. 22, 2017

(30) Foreign Application Priority Data

Dec. 22, 2015  (IT) .................. 102015000086684

(51) Int. Cl.
| | |
|---|---|
| *F16H 57/04* | (2010.01) |
| *F01D 25/18* | (2006.01) |
| *F02C 7/36* | (2006.01) |
| *F02K 3/02* | (2006.01) |
| *F16C 3/02* | (2006.01) |

(Continued)

(52) U.S. Cl.
CPC .......... *F16H 57/0486* (2013.01); *B64C 11/38* (2013.01); *F01D 25/18* (2013.01); *F02C 7/36* (2013.01); *F02K 3/02* (2013.01); *F16C 3/023* (2013.01); *F16H 57/043* (2013.01);
(Continued)

(58) Field of Classification Search
CPC .............................. B63H 3/04; F16H 57/0486
See application file for complete search history.

(56) References Cited

U.S. PATENT DOCUMENTS

| | | |
|---|---|---|
| 2,527,022 A | 10/1950 | May et al. |
| 2,676,458 A | 4/1954 | Hill |

(Continued)

FOREIGN PATENT DOCUMENTS

| | | |
|---|---|---|
| CN | 1824576 A | 8/2006 |
| CN | 103434642 A | 12/2013 |

(Continued)

OTHER PUBLICATIONS

Extended European Search Report and Opinion issued in connection with corresponding EP Application No. 16204975.3 dated Jun. 6, 2017.

(Continued)

*Primary Examiner* — Derek D Knight
(74) *Attorney, Agent, or Firm* — McGarry Bair PC

(57) ABSTRACT

An oil transfer assembly supplies oil into a moving, rotating tube extending along an axis. The assembly is provided with a support plate transversal to the axis and a sleeve, which is angularly fixed with respect to the support plate, it is configured to be coupled in a sliding and watertight way to a terminal section of the inlet of said tube and has at least one chamber for transferring oil into said terminal section of the inlet. The assembly is also equipped with at least two tubular bodies, which project axially from the support plate, define between them an annular channel communicating with the chamber and join the sleeve to the support plate in a watertight manner and with clearances so as to leave freedom of orientation of the sleeve around any direction orthogonal to the axis.

20 Claims, 4 Drawing Sheets

(51) Int. Cl.
*B64C 11/38* (2006.01)
*F16H 1/28* (2006.01)

(52) U.S. Cl.
CPC .............. *F05D 2260/40311* (2013.01); *F05D 2260/98* (2013.01); *F16H 1/28* (2013.01)

(56) References Cited

U.S. PATENT DOCUMENTS

| | | |
|---|---|---|
| 2,855,057 A | 10/1958 | Van Alstyne |
| 2,999,000 A | 9/1961 | Spat |
| 3,074,688 A | 1/1963 | De Muth et al. |
| 4,285,632 A | 8/1981 | DeSalve |
| 7,635,225 B2 | 12/2009 | Lajiness |
| 2006/0191746 A1 | 8/2006 | Diosi et al. |
| 2014/0154076 A1* | 6/2014 | Belmonte ............... B64C 11/38 416/154 |
| 2016/0069186 A1 | 3/2016 | McDonagh |

FOREIGN PATENT DOCUMENTS

| | | |
|---|---|---|
| FR | 1 011 818 A | 6/1952 |
| GB | 2461784 A | 1/2010 |
| WO | 2015/052409 A1 | 4/2015 |

OTHER PUBLICATIONS

Office Action issued in connection with corresponding EP Application No. 16204975.3 dated Jul. 11, 2017.

Machine Translation and First Office Action and Search issued in connection with corresponding CN Application No. 201611198919.1 dated Dec. 25, 2017.

* cited by examiner

OIL TRANSFER ASSEMBLY FOR SUPPLYING OIL INTO A ROTATING AND TRANSLATING TUBE

BACKGROUND

Embodiments of the present invention relate to an oil transfer assembly for supplying oil into a moving, rotating tube. In particular, the present description refers explicitly to a tube that transfers oil to the nose cone of a propeller driven by a planetary gearbox, without loss of generality as a result.

In aeronautical turbo-propeller engines, it is known how to provide a planetary gearbox to operate a drive shaft that supports the propeller and makes it rotate. In general, the nose cone of the propeller has inside it a hydraulic actuator which is controlled in such a way as to vary the pitch of the propeller blades and is supplied with oil through a tube, normally called a beta tube. This tube extends along the axis of the propeller and the drive shaft and has an intermediate section supported inside the nose cone of the propeller and an axial end housed in the drive shaft. When in use, this tube rotates together with the propeller and translates axially upon activation of the hydraulic actuator.

The need has been felt for supplying oil in this tube to the hydraulic actuator, without providing radial holes through the drive shaft. It is also appropriate to provide for such arrangements so as to compensate for the imperfect alignment between the axial ends of the tube, due to inevitable assembly tolerances and processing and to the distortions due to the operating loads.

BRIEF DESCRIPTION

The purpose of the embodiments of the present invention is to provide an oil transfer assembly for supplying oil into a moving, rotating tube that allows for meeting the above-mentioned requirements in a relatively simple manner and allows for performing the necessary maintenance operations in a relatively simple manner.

According to an embodiment of the present invention, an oil transfer unit for supplying oil into a moving, rotating tube is provided.

BRIEF DESCRIPTION OF THE DRAWINGS

Embodiments of the present invention will now be described with reference to the attached drawings which illustrate an example of the embodiment without limitations, wherein.

DETAILED DESCRIPTION

Figure 1:
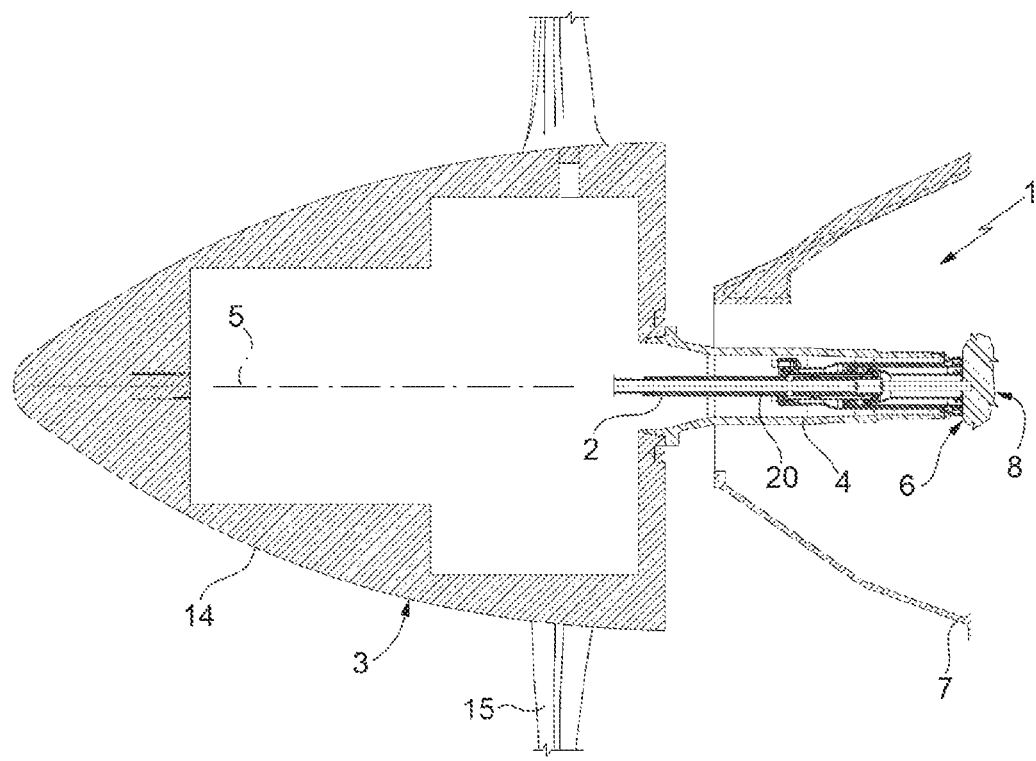
FIG. 1 is a diagram which shows, in a sectional view and with parts removed for clarity, an embodiment of the oil transfer assembly for supplying oil into a moving, rotating tube, according to an embodiment of the present invention.

With reference to the simplified diagram of FIG. 1, the reference number 1 indicates an oil transfer assembly for supplying oil into a moving, rotating tube 2 (partially illustrated), which makes up part of a propeller 3 (partially illustrated) supported by a drive shaft 4, normally also called a propeller shaft. The drive shaft 4 extends along a rotational axis 5, is axially hollow and is driven by a planetary gearbox 6 (partially illustrated) housed in a drive housing 7.

Figure 2:
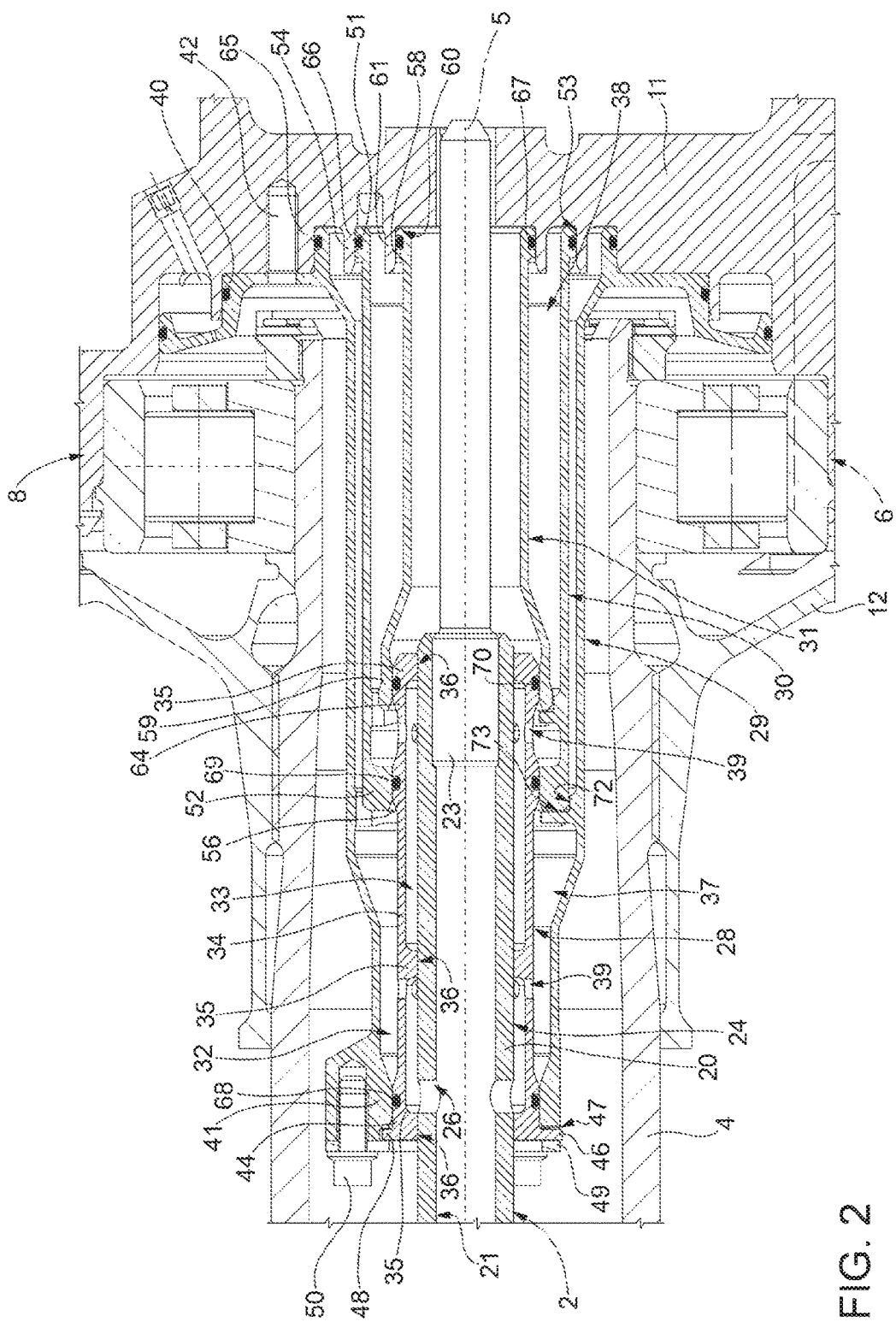
FIG. 2 shows the assembly from FIG. 1 on an enlarged scale.

As can be seen in FIG. 2, the planetary gearbox 6 comprises a satellite gear holder 8 (partially illustrated), in turn comprising a support plate 11 which extends transversely to the axis 4, and is fixed with respect to the drive housing 7 in the particular example taken into consideration. At the same time, the drive shaft 4 is driven by a crown gear (not illustrated) of the planetary gearbox 6 by means of a bell-shaped element 12 (partially illustrated), so as to rotate around the axis 5. In general, it cannot be ruled out that other configurations of the planetary gearbox 6 may be provided for transmitting the rotation motion to the drive shaft 4.

Again with reference to FIG. 1, the propeller 3 comprises an nose cone 14 and a number of blades 15, for which the pitch can be adjusted by operating a hydraulic actuator (not illustrated), which is housed in the nose cone 14 and is supplied with oil through the tube 2. The tube 2 also extends along the axis 5 and is supported in a manner not illustrated so as to rotate together with the propeller 3 around the axis 5 and in such a way as to translate axially in response to the activation of the hydraulic actuator. One of the axial ends of the tube 2 is coupled to the hydraulic actuator in a known way (not illustrated), while the opposite axial end is designated by the reference number 20, extends inside the drive shaft 4 and defines an inlet for the oil.

As can be seen in FIG. 2, the tube 2 has an axial channel 21 for the transfer of oil from the end 20 to the hydraulic actuator. More generally, however, a greater number of channels could be provided in the tube 2 for the axial transfer of oil, for example, in the case in which the hydraulic actuator of the propeller 3 is of the double-acting type.

At the end 20, the channel 21 is axially blind and, in particular, is watertight by an element 23 making up part of a sensor that provides a feedback signal on the axial position of the tube 2 and indicates, indirectly, the value of the pitch of the blades 15.

The end 20 is defined radially by a cylindrical outer surface 24 provided with one or more radial holes 26 in order to convey oil from the assembly 1 into the channel 21. The assembly 1 comprises the plate 11, a sleeve 28 fitted on the surface 24 and three tubular bodies 29, 30 and 31 that join the sleeve 28 to the plate 11, so as to maintain the sleeve 28 in an axial position that is substantially fixed and angularly stopped around the axis 5 with respect to the plate 11.

The surface 24 and the sleeve 28 define two chambers 32, 33, from which the oil flows directly into the holes 26. In particular, the sleeve 28 comprises a tubular wall 34, which is coaxial and spaced radially from the surface 24, and three internal flanges 35 that protrude from the wall 34, axially delimit the chambers 32, 33 and terminate with the respective cylindrical surfaces 36 joined to the surface 24 in a sliding and watertight manner with metal-to-metal coupling without any additional seal ring. Therefore, the sleeve 28 is perfectly concentric with the end 20, while it ensures the sealing of the fluid when the oil goes from the chambers 32, 33 to the channel 21 through the holes 26.

The tubular bodies 29, 30, 31 radially delimit between their two annular channels 37, 38, each of which communicates permanently with a related chamber 32, 33 through radial holes 39 made in the wall 34 in order to convey oil from the plate 11 to the chamber 32, 33. According to variations not illustrated, the number of the chambers 32, 33 and of the corresponding channels 37, 38 may be other than two, for which there may be a different number of tubular bodies 29, 30, 31 to convey the oil to the sleeve 28 and support the sleeve 28 itself.

The tubular bodies 29, 30, 31 project axially from the plate 11 in the axial cavity of the drive shaft 4 and, according to an embodiment of the present invention, they support the sleeve 28 "softly", i.e. in such a way as to let the sleeve 28 float with respect to plate 11 with freedom to move around in any one direction orthogonal to the axis 5 and with the freedom to move radially. This freedom of movement of the sleeve 28 compensates for the inevitable concentricity tolerances of the end 20 with respect to the axis 5 and is conferred by the appropriate coupling clearances between the sleeve 28 and the tubular bodies 29, 30, 31 and/or between the tubular bodies 29, 30, 31 and the plate 11; these clearances are set during the phases of the project on the basis of the specific application, in particular, due to appropriate simulations on the computer.

Figure 5:
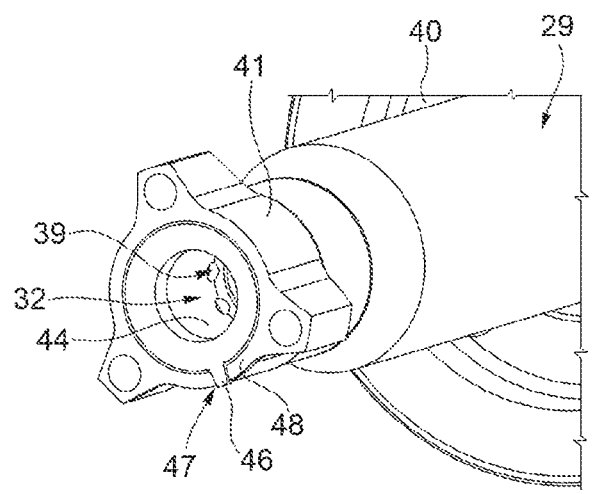
FIG. 5 is a different perspective view showing in detail the assembly of the previous figures.

In particular, the tubular body 29 is the outermost one and comprises two end sections 40, 41 opposite each other: the section 40 is coupled to the plate 11 in a fixed position, for example, by means of screws 42; the section 41, instead, is joined to an axial end 44 of the wall 34 in a fixed angular position and with coupling clearance in a radial and axial direction. As can be seen in FIG. 5, the angular locking is determined by the coupling between a tooth or projection 46 and a corresponding retention base 47. In particular, the tooth 46 forms part of an outer flange 48 of the end 44, while the base 47 is obtained in the section 41.

With reference to FIG. 2, the assembly 1 also comprises a plate with an axial stop 49 axially facing the section 41 and fixed to the latter, for example, by means of the screws 50. The flange 48 is axially constrained, albeit with the aforesaid axial clearance between the section 41 and the plate 49, to which the sleeve 28 remains in an axial position substantially fixed, as mentioned above.

The tubular body 30 is between the tubular bodies 29 and 31 and comprises two end sections 51, 52 opposite one another: the section 51 engages a base 53 defined by a protruding collar 54 of the plate 11; the section 52, instead, is fitted on an intermediate section 56 of the wall 34.

Similarly, the tubular body 31 includes two end sections 58 and 59, of which the section 58 engages a base 60 defined by a protruding collar 61 of the plate 11, while the section 59 is fitted on an axial end 64 of wall 34, opposite the end 44.

The sections 40, 51 and 58 are joined to the plate 11 by means of respective sealing rings 65, 66, 67 for ensuring the seal of the inlet of the channels 37 and 38. Similarly, the sections 41, 52 and 59 are joined to the outer surface of the wall 34 by the respective sealing rings 68, 69, 70 for ensuring the seal of the outlet of the channels 37 and 38.

To ensure the freedom of direction of the sleeve 28, the sections 51 and 58 are not secured to the plate 11, but are joined to the corresponding collars 54 and 61 in an axially sliding manner and with radial clearance so as to allow a slight rotation of the tubular bodies 30 and 31 around any direction orthogonal to the axis 5 and passing through the coupling zone (in practice, this rotation axis intersects the sealing rings 66 and 67, which then define a virtual hinge).

As an alternative or in combination with the freedom of movement provided for the sections 51 and 58 on the bases 53 and 60, a similar relative freedom of movement may be provided between the sections 52 and 56 and between the section 59 and the end 64.

Figure 3:
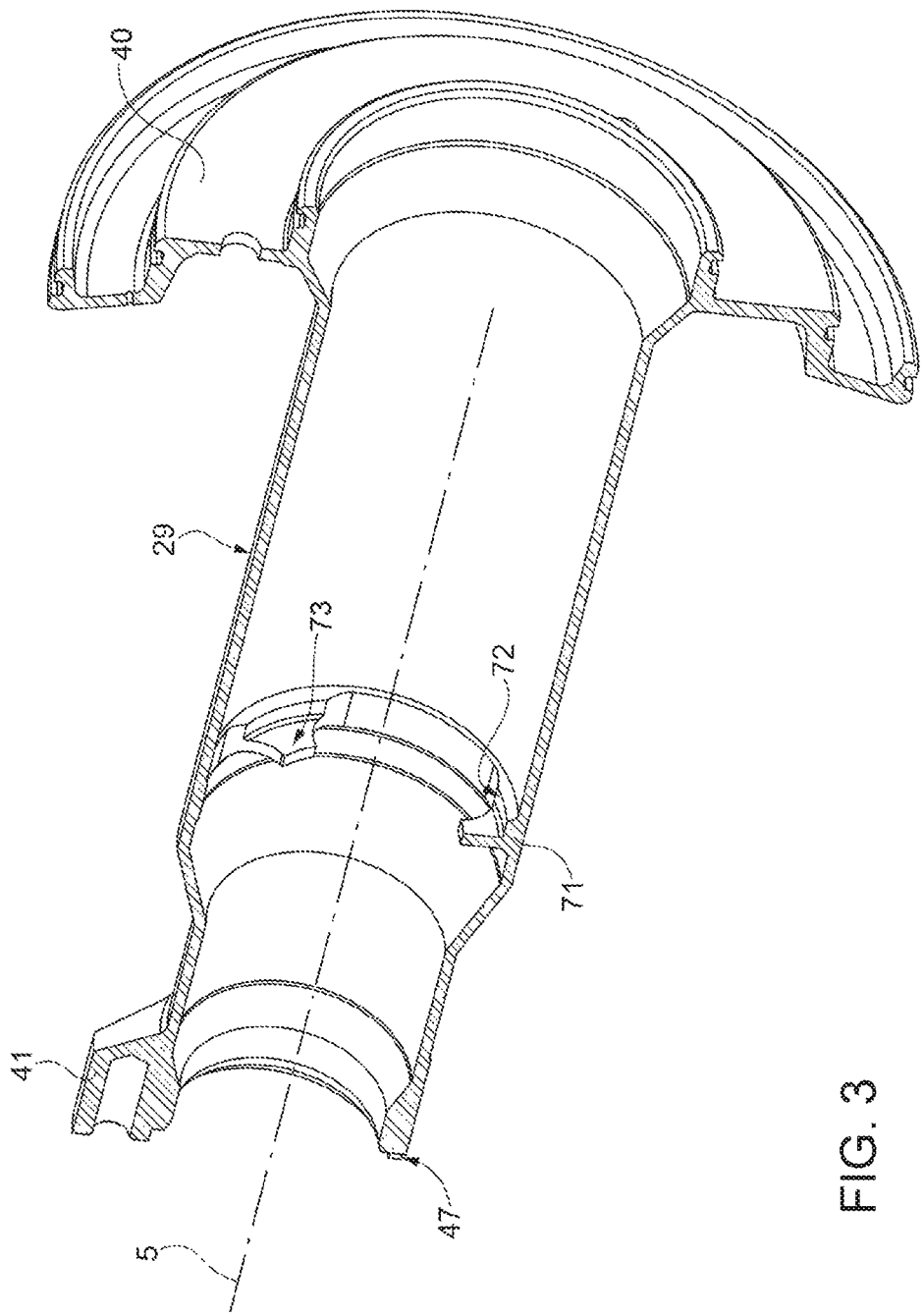
FIGS. 3 and 4 show in perspective and in a sectional view, some of the components shown in FIG. 2.
Figure 4:
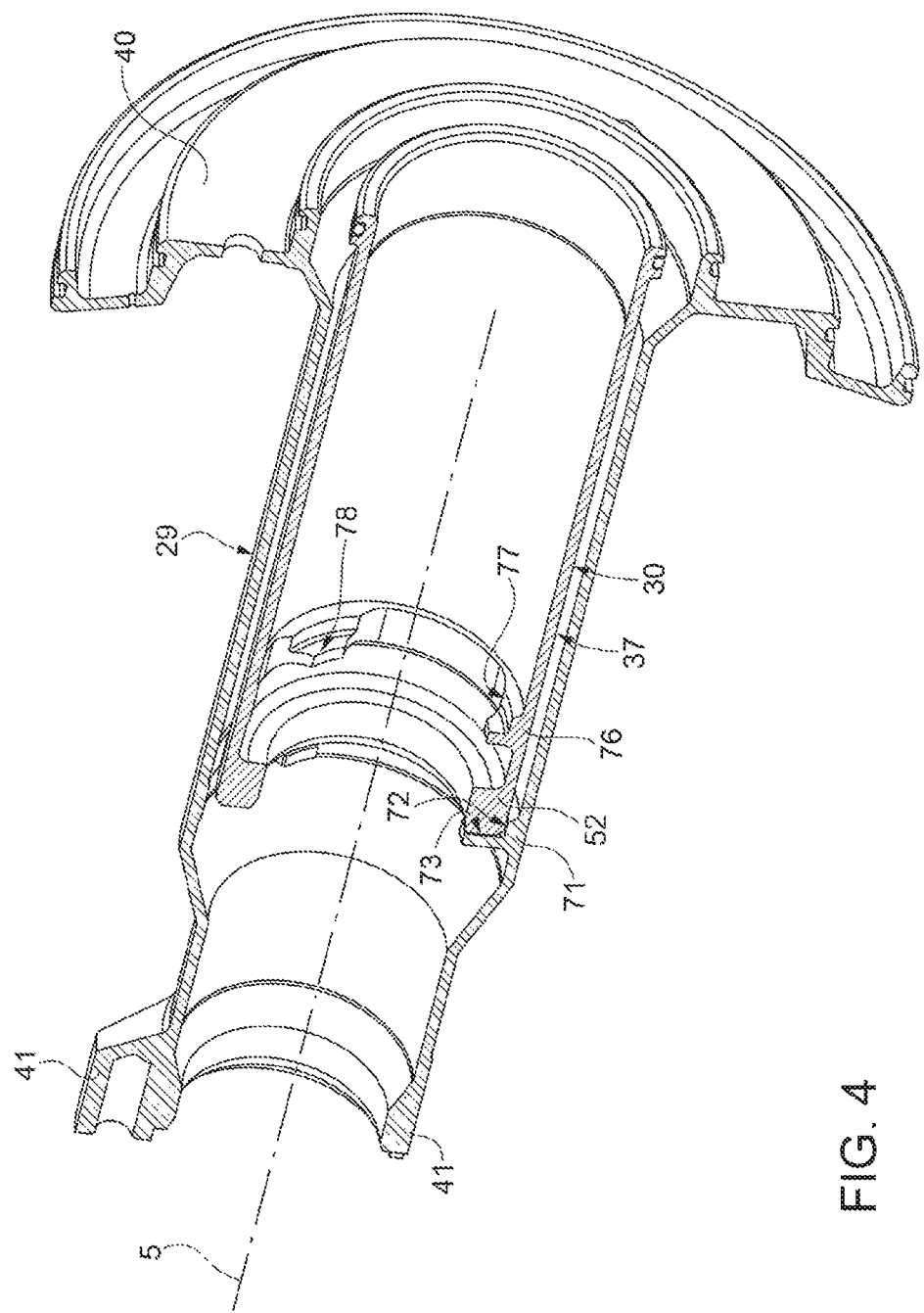

As can be seen in FIGS. 3 and 4, the tubular body 29 comprises an intermediate section 71 that is shaped internally so as to define a radial shoulder 72 and an axial shoulder 73 arranged around and, respectively, facing the section 52, with pre-set clearances, which leave freedom of movement for the section 52 itself. In the meantime, the axial shoulder 73 is intermittent in a circumferential direction so as to allow the oil to flow out freely into the channel 37.

Similarly, the tubular body 30 comprises an intermediate section 76 that is shaped internally so as to define a radial shoulder 77 and an axial shoulder 78 arranged around and, respectively, facing the section 59, with pre-set clearances that leave freedom of movement for the section 59 itself. In the meantime, the axial shoulder 78 is intermittent in a circumferential direction to allow the oil to flow out freely into the channel 38.

The shoulders 72, 73, 77 and 78 define respective bases that, when in use, place a limit on the freedom of movement of the tubular bodies 30 and 31. In particular, the shoulders 73 and 78 prevent the tubular bodies 30 and 31 from axially disengaging the corresponding bases 53 and 60. In addition, the shoulders 72 and 77 define a centering system that supports the tubular bodies 30 and 31 when the sleeve 28 is withdrawn axially from the tubular body 29, for example, during maintenance operations, in order to be able to axially insert the sleeve 28 back into its original position relatively easily.

With reference to FIG. 2, when in use, the oil passes through the plate 11 in the manner illustrated, so as to arrive at the inlet of the channels 37, 38. Through the latter and through the holes 39, the oil flows into the chambers 32, 33. During normal operating conditions, the chamber 32 is closed, while the holes 29 are located at the chamber 33 and make the oil flow from the channel 38 into the tube 2, which then conveys the oil to the hydraulic actuator of the propeller 3. The chamber 32 communicates with the holes 29 and then transfers oil from the channel 37 to the tube 2 only in the case of the reverse thrust of the blades 15.

The rotation of the propeller 3 causes the rotation of the tube 2 around the axis 5, but the actual axis of the end 20 may not perfectly coincide with the axis 5, because of the tolerances of assembly and implementation and distortions due to the operating loads. These concentricity errors are, however, compensated for by the capacity that the sleeve 28 has to move with respect to the plate 11, as a result of the clearances described above. In fact, the actual axis of the sleeve 28 and the end 20 can be arranged parallel to the axis 5 or can be slanted with respect to the axis 5, as a result of the radial clearance that the sleeve 28 has with respect to the tubular body 29 and plate 11. The axial clearance of the sleeve 28 with respect to the tubular body 29 is calibrated simply to allow the pitch of the sleeve 28 with respect to axis 5, and not to allow a substantial axial translation.

As mentioned above, it is possible to perform maintenance operations in a relatively simple manner after uncoupling the propeller 3 from the drive shaft 4 and removing the tube 2 from the sleeve 28. In fact, continuing to operate from the side where the propeller 3 was mounted, the screws 50 are unscrewed so as to remove the plate 49, in order to then axially withdraw the sleeve 28 from the tubular bodies 29, 30, 31.

As mentioned above, after removing the sleeve 28, the section 52 of the tubular body 30 is supported radially on the shoulder 72 of the tubular body 29, and the section 59 of the tubular body 31 is supported radially on the shoulder 77 of the tubular body 31. In other words, the shoulders 72 and 77 stop the pitch of the tubular bodies 30 and 31 due to their weight and, therefore, they keep sections 41, 52 and 59 substantially aligned. It is thus possible to insert the sleeve 28 again in these sections 41, 52 and 59 at the end of the maintenance operations without any difficulty.

From the above description, it is obvious that the assembly 1 makes it possible to supply oil into the channel 21 without providing radial holes through the drive shaft 4, ensures the necessary watertight seal around the end 20 of the tube 2 during the operation and, at the same time, compensates the misalignment of the end 20 with respect to the axis of rotation 5 as a result of the clearances provided between the sleeve 28 and the plate 11.

The assembly 1 also has a relatively low number of components, which are manufactured and then assembled in a relatively simple manner. The same simplicity of assembly is also found in the maintenance operations which, in particular, can be performed from an axial side of the drive housing 7, and not radially through the drive shaft 4.

From the foregoing it is evident that the assembly 1 can be subject to modifications and variations without thereby departing from the protective scope as defined by the attached claims.

In particular, the sleeve 27 and/or the tubular bodies 29, 30, 31 may have dimensions and/or shapes different from those illustrated by way of example.

Finally, the assembly 1 may be used in applications other from that of a propeller 3 of a turbo-propeller engine, for example, in facilities for wind energy and marine propulsion facilities.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An oil transfer assembly for supplying oil into a rotating and translating tube extending along an axis; the assembly comprising:
   a support plate transverse to said axis and defined by a planet-carrier of an epicycloidal transmission;
   a sleeve angularly fixed with respect to said support plate about said axis, wherein the sleeve is configured to be coupled in a sliding and fluid-tight manner to an end inlet portion of said tube, and defines at least one chamber for transferring oil into said end inlet portion; and
   at least a first and a second tubular body which project axially from said support plate, delimit between each other an annular channel communicating with said chamber, and couple said sleeve to said support plate in a fluid-tight manner and with coupling clearances so as to leave freedom of orientation to said sleeve about any direction orthogonal to said axis.

2. An assembly according to claim 1, wherein said coupling clearances are provided:
   between said first tubular body and an axial end of said sleeve; and
   between a first end portion of said second tubular body and said support plate.

3. An assembly according to claim 2, wherein said first tubular body is fixed to said support plate.

4. An assembly according to claim 3, wherein said first tubular body comprises a first shoulder arranged about a second end portion of said second tubular body and defining a rest, in radial direction, for said second end portion.

5. An assembly according to claim 3, wherein said first tubular body comprises a second shoulder axially facing a second end portion of said second tubular body for axially retaining said second tubular body.

6. An assembly according to claim 2, further comprising an axial stop element facing axially said first tubular body and fixed to said first tubular body so as to axially retain said axial end with axial clearance.

7. An assembly according to claim 6, wherein said axial end comprises an external flange which is axially bound, with said axial clearance, between said first tubular body and said axial stop element.

8. An assembly according to claim 6, further comprising an anti-rotation device acting between said sleeve and said first tubular body.

9. A turbo-propeller engine comprising:
   an epicycloidal transmission;
   a drive shaft extending along an axis and driven by said epicycloidal transmission to rotate about said axis;
   a propeller supported and actuated by said drive shaft to rotate about said axis and having a rotating and translating tube, which extends along said axis and comprises an end inlet portion arranged in said drive shaft; and
   an oil transfer assembly as defined in claim 1.

10. An oil transfer assembly for supplying oil into a rotating and translating tube extending along an axis; the assembly comprising:
    a support plate transverse to said axis;
    a sleeve angularly fixed with respect to said support plate about said axis, wherein the sleeve is configured to be coupled in a sliding and fluid-tight manner to an end inlet portion of said tube, and defines at least one chamber for transferring oil into said end inlet portion; and
    at least a first and a second tubular body which project axially from said support plate, delimit between each other an annular channel communicating with said chamber, and couple said sleeve to said support plate in a fluid-tight manner and with coupling clearances so as to leave freedom of orientation to said sleeve about any direction orthogonal to said axis, said coupling clearances being provided between said first tubular body and an axial end of said sleeve and between a first end portion of said second tubular body and said support plate, and said first tubular body being fixed to said support plate and comprising a first shoulder arranged about a second end portion of said second tubular body and defining a rest, in radial direction, for said second end portion.

11. An assembly according to claim 10, wherein said support plate is defined by a planet-carrier of an epicycloidal transmission.

12. An assembly according to claim 10, wherein said first tubular body comprises a second shoulder axially facing a second end portion of said second tubular body for axially retaining said second tubular body.

13. An assembly according to claim 10, further comprising an axial stop element facing axially said first tubular body and fixed to said first tubular body so as to axially retain said axial end with axial clearance.

14. An assembly according to claim 13, wherein said axial end comprises an external flange which is axially bound, with said axial clearance, between said first tubular body and said axial stop element.

15. An assembly according to claim 10, further comprising an anti-rotation device acting between said sleeve and said first tubular body.

16. An oil transfer assembly for supplying oil into a rotating and translating tube extending along an axis; the assembly comprising:
- a support plate transverse to said axis;
- a sleeve angularly fixed with respect to said support plate about said axis, wherein the sleeve is configured to be coupled in a sliding and fluid-tight manner to an end inlet portion of said tube, and defines at least one chamber for transferring oil into said end inlet portion; and
- at least a first and a second tubular body which project axially from said support plate, delimit between each other an annular channel communicating with said chamber, and couple said sleeve to said support plate in a fluid-tight manner and with coupling clearances so as to leave freedom of orientation to said sleeve about any direction orthogonal to said axis, said coupling clearances being provided between said first tubular body and an axial end of said sleeve and between a first end portion of said second tubular body and said support plate;
- an axial stop element facing axially said first tubular body and fixed to said first tubular body so as to axially retain said axial end with axial clearance; and
- an anti-rotation device acting between said sleeve and said first tubular body.

17. An assembly according to claim 16, wherein said first tubular body is fixed to said support plate.

18. An assembly according to claim 17, wherein said first tubular body comprises a first shoulder arranged about a second end portion of said second tubular body and defining a rest, in radial direction, for said second end portion.

19. An assembly according to claim 16, wherein said axial end comprises an external flange which is axially bound, with said axial clearance, between said first tubular body and said axial stop element.

20. An assembly according to claim 16, wherein said support plate is defined by a planet-carrier of an epicycloidal transmission.

* * * * *